US011022752B2

(12) United States Patent
Yang et al.

(10) Patent No.: US 11,022,752 B2
(45) Date of Patent: Jun. 1, 2021

(54) OPTICAL FIBERS HAVING METALLIC MICRO/NANO-STRUCTURE ON END-FACET, AND FABRICATION METHOD, AND APPLICATION METHOD THEREOF

(71) Applicant: Tian Yang, Shanghai (CN)

(72) Inventors: Tian Yang, Shanghai (CN); Xiaolong He, Shanghai (CN)

(73) Assignee: XU YUAN BIOTECHNOLOGY COMPANY, Shanghai (CN)

( * ) Notice: Subject to any disclaimer, the term of this patent is extended or adjusted under 35 U.S.C. 154(b) by 80 days.

(21) Appl. No.: 15/774,589

(22) PCT Filed: Nov. 9, 2015

(86) PCT No.: PCT/CN2015/094144
§ 371 (c)(1),
(2) Date: May 9, 2018

(87) PCT Pub. No.: WO2017/079882
PCT Pub. Date: May 18, 2017

(65) Prior Publication Data
US 2018/0321442 A1   Nov. 8, 2018

(51) Int. Cl.
*G02B 6/122* (2006.01)
*G02B 6/293* (2006.01)
*G02B 5/00* (2006.01)

(52) U.S. Cl.
CPC ........ *G02B 6/1226* (2013.01); *G02B 6/29368* (2013.01); *G02B 5/008* (2013.01)

(58) Field of Classification Search
CPC ...... G02B 6/1226; G02B 6/262; G02B 5/008; G02F 2203/10

(Continued)

(56) References Cited

U.S. PATENT DOCUMENTS

| 6,649,901 B2 * | 11/2003 | Thio | B82Y 35/00 |
| | | | 250/216 |
| 7,057,151 B2 * | 6/2006 | Lezec | G01Q 60/22 |
| | | | 250/216 |

(Continued)

FOREIGN PATENT DOCUMENTS

| CN | 102607607 A | 7/2012 |
| CN | 102628976 A | 8/2012 |

(Continued)

OTHER PUBLICATIONS

"Reflection based extraordinary optical transmission fiber optic pro befor refractive index sensing" by Lan et al, Sensors and Actuators B, vol. 193, pp. 95-99 (Year: 2014).*

(Continued)

*Primary Examiner* — Robert Tavlykaev
(74) *Attorney, Agent, or Firm* — Global IP Services; Tianhua Gu

(57) ABSTRACT

An optical fiber having metallic micro/nano-structure on end-facet, and a fabrication method and an application method thereof. The metallic micro/nano-structure is a micro-nano structure resonance cavity on a metallic film, and generates surface plasmon resonance when an optical fiber guided wave is incident. In the fabrication method according to the present invention, the metallic micro/nano-structure on the surface of the substrate is aligned with and is adhered to the end-facet of the optical fiber, and is removed for transferring to the end-facet of the optical fiber. In the application method according to the present invention, the end-facet of the optical fiber is contacted with or moved towards a medium, and a refractive index of the medium is measured by measuring reflection of an optical fiber guided wave by the metallic micro/nano-structure resonance cavity.

9 Claims, 5 Drawing Sheets

(58) Field of Classification Search
USPC .............................................. 385/37, 38, 123
See application file for complete search history.

(56) References Cited

U.S. PATENT DOCUMENTS

| | | | | |
|---|---|---|---|---|
| 7,167,615 B1* | 1/2007 | Wawro | ................. | G01N 21/648 385/37 |
| 7,773,228 B1* | 8/2010 | Hollingsworth | ....... | A61B 5/291 356/445 |
| 8,269,956 B2* | 9/2012 | Hashiguchi | ............ | G01N 21/55 356/128 |
| 8,328,396 B2* | 12/2012 | Capasso | ................. | G02B 5/008 362/311.12 |
| 8,879,065 B1* | 11/2014 | Lin | ...................... | G01N 21/554 356/326 |
| 9,397,241 B2* | 7/2016 | Berini | ...................... | G02B 6/34 |
| 2007/0253051 A1* | 11/2007 | Ishihara | ................. | G03B 21/56 428/644 |
| 2010/0226134 A1* | 9/2010 | Capasso | ................. | B82Y 20/00 362/311.02 |
| 2012/0045578 A1* | 2/2012 | Di Fabrizio | ........... | B82Y 20/00 427/163.2 |
| 2012/0140232 A1 | 6/2012 | Lee et al. | | |
| 2014/0016895 A1* | 1/2014 | Capasso | ................. | B82Y 20/00 385/11 |
| 2014/0056559 A1* | 2/2014 | Wawro | ................. | G01N 21/648 385/37 |
| 2014/0311662 A1* | 10/2014 | Choi | ...................... | G02B 5/008 156/234 |

FOREIGN PATENT DOCUMENTS

| | | |
|---|---|---|
| CN | 104345358 A | 2/2015 |
| JP | 2006259064 A | 9/2006 |

OTHER PUBLICATIONS

"Engineering surface plasmon based fiber-optic sensors" by Dhawan et al, Materials Science and Engineering B, vol. 149, pp. 237-241 (Year: 2008).*

"Surface-Enhanced Resonance Raman Scattering (SERRS) Using Au Nanohole Arrays on Optical Fiber Tips" by Andrade et al, Plasmonics, vol. 8, pp. 1113-1121 (Year: 2013).*

"Multiple Modes of a Photonic Crystal Cavity on a Fiber Tip for Multiple Parameter Sensing" by Boerkamp etal, Journal of Lightwave Technology, vol. 33, No. 18, pp. 3901-3906 (Year: 2015).*

"Focused ion beam fabrication of metallic nanostructures on end faces of optical fibers for chemical sensing applications" by Dhawan et al, Journal of Vacuum Science & Technology B: Microelectronics and Nanometer Structures Processing, Measurement, and Phenomena 26, pp. 2168-2173 (Year: 2008).*

"A Miniaturized Sensor Consisting of Concentric Metallic Nanorings on the End Facet of an Optical Fiber" by Feng et al, Small, vol. 8, No. 12, pp. 1937-1944 (Year: 2012).*

"A photonic crystal cavity-optical fiber tip nanoparticle sensor for biomedical applications" by Shambat et al, Applied Physics Letters, vol. 100, paper 213702 (Year: 2012).*

\* cited by examiner

OPTICAL FIBERS HAVING METALLIC MICRO/NANO-STRUCTURE ON END-FACET, AND FABRICATION METHOD, AND APPLICATION METHOD THEREOF

BACKGROUND OF THE PRESENT INVENTION

Field of Invention

The present invention relates to the field of micro/nano optical devices, and specifically to, an optical fiber having a metallic micro/nano-structure on the end-facet, and fabrication method, and application method thereof.

Description of Related Arts

Surface plasmons are surface waves formed by the coupling between the surface charge oscillation on a metallic surface and an electromagnetic field. When a lightwave is incident onto an interface between a metallic and a dielectric, the free electrons on the surface of the metallic collectively oscillate, and the lightwave is coupled to the free electrons on the surface of the metallic and form the surface plasmons. When the frequency and phase of the surface plasmons match those of the incident lightwave, resonant oscillation is generated, and the resonance conditions such as the wavelength, the reflectivity, and the reflection angle change with the ambient refractive index. Therefore, the surface plasmon resonance (SPR) is used to measure the ambient refractive index. The measurement can tell the interactions of the molecules and the concentrations of molecule solutions, and it has been widely applied in life science research, drug screening, and food industry.

It has been pursued by researchers for many years to integrate SPR with optical fibers to conveniently excite SPR and perform sensing by fiber-optic guided-wave technologies. By integrating micro-nano devices on the end-facets of optical fibers and exciting and probing the micro-nano devices by fiber guided light waves, the mature fiber-optic communication technologies can be very well integrated with the novel sensing technology, and simple, convenient, flexible, and portable functional optical devices can be achieved. At the same time, since optical fibers are very thin, this type of devices can be inserted into tiny spaces and in-vivo environments. However, optical fiber end-facet SPR devices in the prior art adopt a periodic micro-nano metallic structure with a single period, the performance of which is far inferior to that of the commercial SPR sensors based on free-space optics. Consequently real applications haven't been found. To overcome this problem, some researchers had fabricated SPR devices on the sidewalls of optical fibers, but this kind of devices are limited in the ways that the samples can be held.

In another aspect, it is very challenging to fabricate micro-nano patterns and devices directly on the end-facets of optical fibers in an efficient way, using the existing mainstream micro-nano patterning technologies, including ultraviolet lithography, electron beam lithography, focused ion beam milling (FIB), and the like. The reasons are as follows: if ultraviolet lithography or electron beam lithography is applied to directly pattern the end-facets of optical fibers, photoresists need to be evenly and controllably coated onto the fiber end-facets. In order to achieve high patterning precision, the thickness of the photoresist needs to be very uniform over the entire optical fiber end-facet. However, since the area of the optical fiber end-facet is very small (e.g., the diameter of the cladding of an optical fiber used for fiber-optic communication is usually only about 125 microns), a spin-coating method which is commonly used in the semiconductor industry can't be adopted for coating the photoresist here. People have used the technique in which a droplet of photoresist is placed on the end-facet of the optical fiber by dipping the fiber tip into the photoresist, and then the photoresist droplet is blown off by a gas gun to leave a flat photoresist layer. However, this method is very inaccurate in controlling the thickness of the photoresist layer, and has a very low yield for micro-nano patterning the end-facets of optical fibers (Shengfei Feng, Xinping Zhang, Hao Wang, Mudi Xin, and Zhenzhen Lu, "Fiber coupled waveguide grating structures," Appl. Phys. Lett. 96, 133101 (2010)). Meanwhile, if micro-nano patterning of the end-facets of optical fibers are done by FIB, although the patterning can be achieved, the fabrication time is very long, and the fabrication cost is very high. Moreover, the focusing parameters of the FIB instrument have to be re-calibrated for each optical fiber (A. Dhawan, J. F. Muth, D. N. Leonard, M. D. Gerhold, J. Gleeson, T. Vo-Dinh, and P. E. Russell, "Focused ion beam fabrication of metallicnanostructures on end-facets of optical fibers for chemical sensing applications," J. Vac. Sci. Technol. B 26, 2168 (2008)).

SUMMARY OF THE PRESENT INVENTION

In view of the disadvantages in the prior art, an object of the present invention is to provide an optical fiber having a metallic micro/nano-structure on the end-facet, and a fabrication method and an application method thereof, in order to integrate high-performance surface plasmon resonance onto an optical fiber. By using a metallic micro/nano-structure resonance cavity, the present invention provides desirable performance of surface plasmon resonance integrated with an end-facet of the optical fiber. By using a fabrication method of glue-and-strip, and aligning the end-facet of the optical fiber and the metallic micro/nano-structure, the present invention provides a high-quality, simple and fast fabrication method of an optical fiber having an end-facet comprising a metallic micro/nano-structure. By using the optical fiber having an end-facet comprising a metallic micro/nano-structure, the present invention provides a sensing method highly sensitive to the ambient refractive index.

In order to accomplish the above objects and other related objects, the present invention provides an optical fiber having a metallic micro/nano-structure on its end-facet, wherein the metallic micro/nano-structure is a metallic micro/nano-structure resonance cavity, and the metallic micro/nano-structure resonance cavity is formed by micro-nano patterns on a metallic film.

Preferably, the metallic micro/nano-structure resonance cavity is formed by micro-nano patterns on a metallic film, and the metallic micro/nano-structure resonance cavity makes the surface plasmon polaritons on the metallic film resonate.

The end-facet is an optical fiber end-facet approximately perpendicular to the optical fiber. Preferably, "the end-facet is an optical fiber end-facet which is approximately perpendicular to the optical fiber" indicates that an angle between the end-facet and the optical fiber is within the range of 90±8 degrees, and to achieve a better effect, the angle is within the range of 90±2 degrees.

As a preferred solution of the optical fiber having a metallic micro/nano-structure on the end-facet according to the present invention, the metallic micro/nano-structure resonance cavity comprises a middle area and a surrounding area.

As a preferred solution of the optical fiber having a metallic micro/nano-structure on the end-facet according to the present invention, the position of the middle area is aligned with a core layer of the optical fiber.

As a preferred solution of the optical fiber having a metallic micro/nano-structure on the end-facet according to the present invention, the middle area is used to couple with the incident fiber-guided lightwaves so that surface plasmon polaritons on the metallic film are excited.

As a preferred solution of the optical fiber having a metallic micro/nano-structure on the end-facet according to the present invention, the surrounding area is used to reflect the surface plasmon polaritons on the metallic film.

As a preferred solution of the optical fiber having a metallic micro/nano-structure on the end-facet according to the present invention, the middle area comprises a periodic array of metallic micro-nano structures.

As a preferred solution of the optical fiber having a metallic micro/nano-structure on the end-facet according to the present invention, a period of the periodic arrays of metallic micro-nano structures the middle area is approximately equal to a wavelength of the surface plasmon resonance on the metallic film. Preferably, "approximately equal to" in the present invention indicates that a deviation is within ±10%.

As a preferred solution of the optical fiber having a metallic micro/nano-structure on the end-facet according to the present invention, the periodic array of metallic micro-nano structures in the middle area is a periodic nanoslit array.

As a preferred solution of the optical fiber having a metallic micro/nano-structure on the end-facet according to the present invention, the periodic array of metallic micro-nano structures in the middle area is a square array.

As a preferred solution of the optical fiber having a metallic micro/nano-structure on the end-facet according to the present invention, the surrounding area comprises periodic arrays of metallic micro-nano structures.

As a preferred solution of the optical fiber having a metallic micro/nano-structure on the end-facet according to the present invention, a period of the periodic arrays of metallic micro-nano structures in the surrounding area is approximately equal to half the wavelength of surface plasmon resonance on the metallic film.

As a preferred solution of the optical fiber having a metallic micro/nano-structure on the end-facet according to the present invention, the periodic arrays of metallic micro-nano structures in the surrounding area are periodic nanoslit arrays.

As a preferred solution of the optical fiber having a metallic micro/nano-structure on the end-facet according to the present invention, the periodic arrays of metallic micro-nano structures in the surrounding area are square arrays.

As a preferred solution of the optical fiber having a metallic micro/nano-structure on the end-facet according to the present invention, the width of the nanoslits is 5 to 200 nm, and the depth of the nanoslits is 5 to 200 nm.

As a preferred solution of the optical fiber having a metallic micro/nano-structure on the end-facet according to the present invention, the optical fiber is a single-mode optical fiber and/or a bare optical fiber.

As a preferred solution of the optical fiber having a metallic micro/nano-structure on the end-facet according to the present invention, the metal is gold.

The present invention further provides a fabrication method of an optical fiber having a metallic micro/nano-structure on the end-facet. The method comprises at least the following steps:

1) providing a substrate and an optical fiber, fabricating, on the surface of the substrate, a metallic micro/nano-structure having a property of being weakly adherent to the substrate;

2) applying an adhesive on the end-facet of the optical fiber or the surface of the metallic micro/nano-structure;

3) adjusting the relative position of the optical fiber so that the end-facet of the optical fiber is aligned with the position of the metallic micro/nano-structure, and the end-facet of the optical fiber is in contact with the metallic micro/nano-structure through the adhesive (the end-facet of the optical fiber is not necessarily in direct contact with the metallic micro/nano-structure); and 4) exposing the adhesive under an adhesive curing light, where the curing light penetrates through the substrate and the metallic micro/nano-structure before it reaches the adhesive, so that the adhesive is cured, and the cured adhesive binds the metallic micro/nano-structure and the end-facet of the optical fiber, then removing the end-facet of the optical fiber and the metallic micro/nano-structure from the surface of the substrate to complete the fabrication.

As a preferred solution of the fabrication method of an optical fiber having a metallic micro/nano-structure on the end-facet according to the present invention, the substrate is a substrate transparent to ultraviolet light, such as glass, quartz, or mica, the adhesive curing light is ultraviolet light, and the adhesive is cured when being irradiated by ultraviolet light.

As a preferred solution of the fabrication method of an optical fiber having a metallic micro/nano-structure on the end-facet according to the present invention, a method for aligning the end-facet of the optical fiber with the position of the metallic micro/nano-structure is: sending a wide-spectrum light into the optical fiber, wherein the wide-spectrum light propagates along the optical fiber, emits from the end-facet of the optical fiber, and then reflects off the metallic micro/nano-structure to return back into the optical fiber, moving the relative positions of the optical fiber and the metallic micro/nano-structure, and measuring a spectrum of this reflected light during the movement process, determining whether the end-facet of the optical fiber is aligned with the metallic micro/nano-structure by comparing the spectrum of the reflected light with an expected reflection spectrum for a perfect alignment.

As a preferred solution of the fabrication method of an optical fiber having a metallic micro/nano-structure on the end-facet according to the present invention, when the substrate is a transparent substrate, a method for aligning the end-facet of the optical fiber with the position of the metallic micro/nano-structure is: performing microscopy observation from the direction of the surface of the substrate which does not have the metallic micro/nano-structure, and observing and aligning the end-facet of the optical fiber with the position of the metallic micro/nano-structure. This method may be used in combination with or independent of the method in the previous preferred solution of aligning the end-facet of the optical fiber with the position of the metallic micro/nano-structure.

As a preferred solution of the fabrication method of an optical fiber having a metallic micro/nano-structure on the end-facet according to the present invention, the end-facet is an optical fiber end-facet approximately perpendicular to the optical fiber, the metallic micro/nano-structure is a metallic micro/nano-structure resonance cavity, and the metallic micro/nano-structure resonance cavity is formed by micro-nano patterns on a metallic film, and it makes the surface plasmon polaritons on the metallic film resonate.

As a preferred solution of the fabrication method of an optical fiber having a metallic micro/nano-structure on the end-facet according to the present invention, the metallic micro/nano-structure resonance cavity comprises a middle area and a surrounding area.

As a preferred solution of the fabrication method of an optical fiber having a metallic micro/nano-structure on the end-facet according to the present invention, the position of the middle area is aligned with a core layer of the optical fiber.

As a preferred solution of the fabrication method of an optical fiber having a metallic micro/nano-structure on the end-facet according to the present invention, the middle surrounding area is used to couple with the incident fiber guided wave so that surface plasmon polaritons are excited.

As a preferred solution of the fabrication method of an optical fiber having a metallic micro/nano-structure on the end-facet according to the present invention, the surrounding area is used to reflect the surface plasmon polaritons.

As a preferred solution of the fabrication method of an optical fiber having a metallic micro/nano-structure on the end-facet according to the present invention, the middle area comprises a periodic array of metallic micro-nano structures As a preferred solution of the fabrication method of an optical fiber having a metallic micro/nano-structure on the end-facet according to the present invention, a period of the periodic array of metallic micro-nano structures in the middle area is approximately equal to a wavelength of the surface plasmon resonance on the metallic film.

As a preferred solution of the fabrication method of an optical fiber having a metallic micro/nano-structure on the end-facet according to the present invention, the periodic array of metallic micro-nano structures in the middle area is a periodic nanoslit array.

As a preferred solution of the fabrication method of an optical fiber having a metallic micro/nano-structure on the end-facet according to the present invention, the periodic metallic array of micro-nano structure in the middle area is a square array.

As a preferred solution of the fabrication method of an optical fiber having a metallic micro/nano-structure on the end-facet according to the present invention, the surrounding area comprises periodic arrays of metallic micro-nano structures.

As a preferred solution of the fabrication method of an optical fiber having a metallic micro/nano-structure on the end-facet according to the present invention, a period of the periodic arrays of metallic micro-nano structures in the surrounding area is approximately equal to half the wavelength of surface plasmon resonance on the metallic film.

As a preferred solution of the fabrication method of an optical fiber having a metallic micro/nano-structure on the end-facet according to the present invention, the periodic arrays of metallic micro-nano structures in the surrounding area are periodic nanoslit arrays.

As a preferred solution of the fabrication method of an optical fiber having a metallic micro/nano-structure on the end-facet according to the present invention, the periodic arrays of metallic micro-nano structure in the surrounding area are square arrays.

As a preferred solution of the fabrication method of an optical fiber having a metallic micro/nano-structure on the end-facet according to the present invention, the width of the nanoslits is 5 to 200 nm, and the depth of the nanoslits is 5 to 200 nm.

As a preferred solution of the fabrication method of an optical fiber having a metallic micro/nano-structure on the end-facet according to the present invention, the optical fiber is a single-mode optical fiber and/or a bare optical fiber.

As a preferred solution of the fabrication method of an optical fiber having a metallic micro/nano-structure on the end-facet according to the present invention, the metal is gold.

The present invention further provides an application method of using an optical fiber having a metallic micro/nano-structure on the end-facet as a sensor, wherein the end-facet is an optical fiber end-facet which is approximately perpendicular to the optical fiber, the metallic micro/nano-structure is a metallic micro/nano-structure resonance cavity, the metallic micro/nano-structure resonance cavity is formed by the micro-nano patterns on a metallic film, and the metallic micro/nano-structure resonance cavity makes surface plasmon polaritons on the metallic film resonate, and the method comprises the following steps:

(1) let the end-facet of the optical fiber that comprises the metallic micro/nano-structure resonance cavity be in contact with or approaching a medium, where the medium may be an external substance, such as molecules that adsorb or bind to the end-facet of the optical fiber and/or the metallic surface, aqueous and gaseous environments, or it may be a substance inside the optical fiber sensing device, such as an adhesive or another substance between the metallic micro/nano-structure and the end-facet of the optical fiber, or a substance that is deposited on the end-facet of the optical fiber and/or the metallic surface;

(2) collecting the reflected light that has propagated along the optical fiber, reached the end-facet of the optical fiber, and been reflected back into the optical fiber after experiencing surface plasmon resonance at the metallic micro/nano-structure resonance cavity; and (3) analyzing a spectrum and/or an intensity of this reflected light, and obtaining information about the refractive index of the medium according to the change of wavelength and/or reflectivity of surface plasmon resonance with the change of ambient refractive index.

As a preferred solution of the application method of using an optical fiber having a metallic micro/nano-structure on the end-facet as a sensor of the present invention, the metallic micro/nano-structure resonance cavity comprises a middle area and a surrounding area.

As a preferred solution of the application method of using an optical fiber having a metallic micro/nano-structure on the end-facet as a sensor of the present invention, the position of the middle area is aligned with a core layer of the optical fiber.

As a preferred solution of the application method of using an optical fiber having a metallic micro/nano-structure on the end-facet as a sensor of the present invention, the middle area is used to couple with the incident fiber-guided waves so that suface plasmon polaritons are excited.

As a preferred solution of the application method of using an optical fiber having a metallic micro/nano-structure on the end-facet as a sensor of the present invention, the surrounding area is used to reflect the surface plasmon polaritons.

As a preferred solution of the application method of using an optical fiber having a metallic micro/nano-structure on the end-facet as a sensor of the present invention, the middle area comprises a periodic array of metallic micro-nano structures.

As a preferred solution of the application method of using an optical fiber having a metallic micro/nano-structure on the end-facet as a sensor of the present invention, a period of the periodic array of metallic micro-nano structures in the middle area is approximately equal to a wavelength of surface plasmon resonance on the metallic film.

As a preferred solution of the application method of using an optical fiber having a metallic micro/nano-structure on the end-facet as a sensor of the present invention, the periodic array of metallic micro-nano structures in the middle area is a periodic nanoslit array.

As a preferred solution of the application method of using an optical fiber having a metallic micro/nano-structure on the end-facet as a sensor of the present invention, the periodic array of metallic micro-nano structures in the middle area is a square array.

As a preferred solution of the application method of using an optical fiber having a metallic micro/nano-structure on the end-facet as a sensor of the present invention, the surrounding area comprises periodic arrays of metallic micro-nano structures.

As a preferred solution of the application method of using an optical fiber having a metallic micro/nano-structure on the end-facet as a sensor of the present invention, a period of the periodic arrays of metallic micro-nano structures in the surrounding area is approximately equal to half the wavelength of surface plasmon resonance on the metallic film.

As a preferred solution of the application method of using an optical fiber having a metallic micro/nano-structure on the end-facet as a sensor of the present invention, the periodic arrays of metallic micro-nano structures in the surrounding area are periodic nanoslit arrays.

As a preferred solution of the application method of using an optical fiber having a metallic micro/nano-structure on the end-facet as a sensor of the present invention, the periodic arrays of metallic micro-nano structures in the surrounding area are square arrays.

As a preferred solution of the application method of using an optical fiber having a metallic micro/nano-structure on the end-facet as a sensor of the present invention, the width of the nanoslits is 5 to 200 nm, and the depth of the nanoslits, that is, the thickness of the metallic film, is 5 to 200 nm.

As a preferred solution of the application method of using an optical fiber having a metallic micro/nano-structure on the end-facet as a sensor of the present invention, the optical fiber is a single-mode optical fiber and/or a bare optical fiber.

As a preferred solution of the application method of using an optical fiber having a metallic micro/nano-structure on the end-facet as a sensor of the present invention, the metal is gold.

As described above, the optical fiber having a metallic micro/nano-structure on the end-facet, and the fabrication method and the application method thereof according to the present invention have the following beneficial effects: the integration between the metallic micro/nano-structure resonance cavity and the optical fiber waveguide allows high-performance surface plasmon resonance to be excited and probed by using fiber-optic guided-wave technologies. Here, high-performance particularly refers to a high quality factor surface plasmon resonance spectra, and a high figure-of-merit for refractive index sensing. Consequently, the mature fiber-optic communication technologies can be desirably integrated with the surface plasmon resonance sensing technologies, and, at the same time, simple, flexible, portable and in-vivo sensing devices can be realized. The fabrication method according to the present invention avoids complicated fabrication procedures and increased costs resulting from direct micro/nano patterning of the end-facet of optical fiber, by achieving a high quality, simple and fast transfer of the metallic micro/nano-structure onto the end-facet of the optical fiber with precision alignment, gluing and stripping. When the present invention is applied to refractive index sensing, a limit of detection for minimum refractive index change has been achieved which is over one order of magnitude smaller than any previously reported results for surface plasmon resonance refractive index sensing devices on the end-facets of optical fibers. In the future, the sensor surface may be chemically modified and functionalized for capturing specific molecules, and biological or chemical sensing shall be performed relying upon the refractive index change caused by molecular binding and dissociation. In the future, a variety of signals (such as pressure, temperature, sound/ultrasound/infrasound, and electromagnetic wave) can be measured by attaching to the end-facet of the optical fiber or the surface of the metallic micro/nano-structure a substance whose effective refractive index changes with the signals. In conclusion, the optical fiber having a metallic micro/nano-structure on the end-facet according to the present invention has a high capability of surface plasmon resonance sensing, an efficient and simple fabrication method, and it shows promises for a broad range of applications.

| Description of component mark numbers | |
|---|---|
| 101 | Optical fiber |
| 102 | Metallic micro/nano-structure resonance cavity |
| 103 | Middle area |
| 104 | Surrounding area |
| 105 | Adhesive |
| 106 | Substrate |
| 107 | Mounting stage |
| 108 | Stereomicroscope |
| 109 | Five-axis motion stage |
| 110 | Wide-spectrum light source |
| 111 | Spectrometer |
| 112 | Imaging device |
| 113 | Lens |
| 114 | Light source of adhesive curing light |
| S1-S4 | Steps |

DETAILED DESCRIPTION OF THE PREFERRED EMBODIMENTS

The following describes implementations of the present invention by using particular specific embodiments, and a person skilled in the art may readily know other advantages and effects of the present invention based on content disclosed in this specification. The present invention may further be implemented or applied by using other different specific implementations, and details in this specification may further be modified or changed in various forms based on different opinions and applications without departing from the spirit of the present invention.

Refer to FIG. 1 to FIG. 8. It should be noted that figures provided in this embodiment are merely intended to exemplarily describe basic ideas of the present invention. Therefore, the figures show only related components of the present invention and are not drawn according to a quantity of components, shapes, and sizes during actual implementation. During actual implementation, forms, quantities, and proportions of various components may be randomly changed, and a component deployment manner thereof may be more complex.

Figure 1:
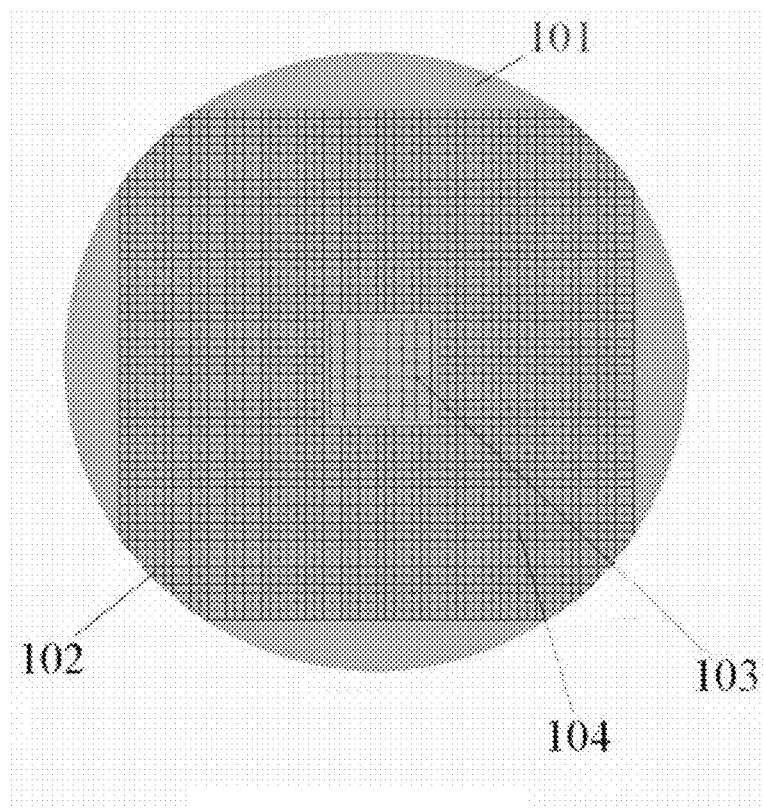
FIG. 1 shows a schematic structural diagram of a metallic micro/nano-structure resonance cavity on an end-facet of an optical fiber having a metallic micro/nano-structure on the end-facet according to the present invention.

This embodiment provides an optical fiber 101 having a metallic micro/nano-structure on the end-facet. The end-facet is an optical fiber end-facet approximately perpendicular to the optical fiber 101. In a specific embodiment, "approximately perpendicular" indicates that an angle between the end-facet and the optical fiber has a range of 90±8 degrees, and preferably has a range of 90±2 degrees. The metallic micro/nano-structure is a metallic micro/nano-structure resonance cavity 102, and the metallic micro/nano-structure resonance cavity is formed by micro-nano patterns on a metallic film, and the metallic micro/nano-structure resonance cavity makes the surface plasmon polaritons on the metallic film resonate. As an example, the optical fiber is a single-mode optical fiber (Nufern 780-HP) with its working wavelength above 780 nm, and the leading end of the optical fiber is a bare optical fiber. As an example, the metal is gold. As shown in FIG. 1, the metallic micro/nano-structure resonance cavity 102 comprises a middle area 103 and a surrounding area 104. The position of the middle area 103 is aligned with the core layer of the optical fiber 101. The middle area 103 and the surrounding area 104 are both periodic arrays of metallic micro-nano structures, and the periodic arrays of metallic micro-nano structures are periodic nanoslit arrays. The width of the nanoslits is 50 nm, and the depth of the nanoslits is 55 nm (which is equal to the thickness of the metallic film, and the nanoslits penetrate through the metallic film). The periodic array of metallic micro-nano structure of the middle area 103 is a square array having an approximate size of 11×11 $\mu m^2$, the period of the periodic array of metallic micro-nano structure in the middle area 103 is 645 nm, and the period is approximately equal to the wavelength of surface plasmon resonance on the metallic film. The periodic array of metallic micro-nano structure of the surrounding area 104 surrounds the middle area 103, and is a square array whose outer boundaries have an approximate size of 100×100 $\mu m^2$, the period of the periodic array of metallic micro-nano structures in the surrounding area 104 is 315 nm, and the period is approximately equal to half the wavelength of surface plasmon resonance on the metallic film. When a lightwave is incident from the core layer of the optical fiber, the middle area 103 is coupled to the incident fiber-optic guided lightwave to excite surface plasmon polaritons (on the metallic film), and the surrounding area reflects the surface plasmon polaritons. It should be noted that the numbers of periods in the periodic metallic micro-nano array structures in FIG. 1 are not the same as in the foregoing description, and are just for schematic drawing purpose. When the optical fiber having the metallic micro/nano-structure resonance cavity on the end-facet as described in the foregoing is immersed in water, surface plasmon resonance corresponding to a free space wavelength of approximately 850 nm will result from its material and structural properties. The optical fiber is a single-mode optical fiber at this wavelength. In a specific embodiment, "approximately equal to" in the present invention indicates that a deviation of a numerical value is within ±10%.

Figure 2:
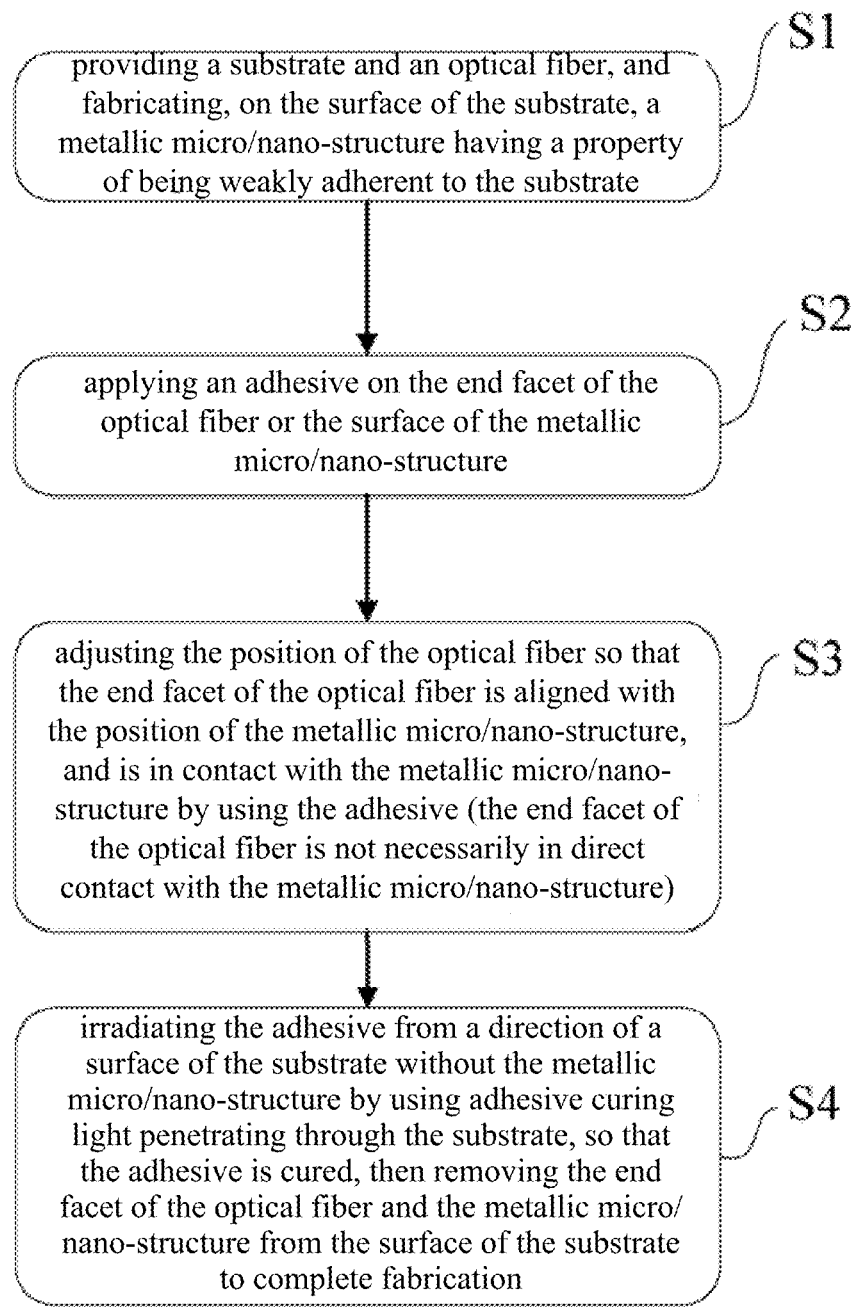
FIG. 2 shows a schematic diagram of an implementation procedure of a fabrication method of an optical fiber having a metallic micro/nano-structure on the end-facet according to the present invention.

The present invention further provides a fabrication method of an optical fiber 101 having a metallic micro/nano-structure on the end-facet. As shown in FIG. 2, the method comprises at least the following steps:

First, step 1) S1: Provide a substrate 106 and an optical fiber 101, and fabricate, on the surface of the substrate 106, a metallic micro/nano-structure having a property of being weakly adherent to the substrate 106. Step 2) S2: Apply an adhesive 105 on the end-facet of the optical fiber or the surface of the metallic micro/nano-structure. Step 3) S3: Adjust the relative position of the optical fiber 101 so that the end-facet of the optical fiber is aligned with the position of the metallic micro/nano-structure, and the end-facet of the optical fiber is in contact with the metallic micro/nano-structure through the adhesive 105 (the end-facet of the optical fiber is not necessarily in direct contact with the metallic micro/nano-structure). Finally, step 4) S4: Expose the adhesive 105 under an adhesive curing light, where the curing light penetrates through the substrate and the metallic micro/nano-structure before it reaches the adhesive from the side of the back surface of the substrate 106 (a surface without the metallic micro/nano-structure), so that the adhesive 105 is cured, then remove the end-facet of the optical fiber and the metallic micro/nano-structure from the surface of the substrate 106 to complete the fabrication.

As an example, the substrate 106 is a substrate transparent to ultraviolet light, the adhesive curing light is ultraviolet light, and the adhesive 105 is cured when being exposed under ultraviolet light. In an embodiment, the substrate 106 is a piece of quartz, the adhesive 105 is Norland NOA81, the adhesive is also transparent to an optical wavelength used for sensing, an ultraviolet curing wavelength range is 100 to 400 nm, curing light intensity is 1 to 2000 J/cm², and a curing time is 5 to 600 s. Preferably, the curing wavelength is around 320 nm, curing light intensity is 100 J/cm², and a curing time is 300 s. In an embodiment, a light source 114 of the adhesive curing light is an ultraviolet light source having a center wavelength of 320 nm and maximum irradiation power of 2000 J/cm².

As an example, in the optical fiber 101 having a metallic micro/nano-structure on the end-facet, the end-facet is an optical fiber end-facet which is approximately perpendicular to the optical fiber 101, the metallic micro/nano-structure is a metallic micro/nano-structure resonance cavity 102, and the metallic micro/nano-structure resonance cavity is formed by micro-nano patterns on a metallic film, and the metallic micro/nano-structure resonance cavity makes the surface plasmon polaritons on the metallic film resonate. As an example, the optical fiber is a single-mode optical fiber (Nufern 780-HP) with wavelength above 780 nm, and the leading end of the optical fiber is a bare optical fiber. As an example, the metal is gold. As shown in FIG. 1, the metallic micro/nano-structure resonance cavity 102 comprises a middle area 103 and a surrounding area 104. The position of the middle area 103 is aligned with a core layer of the optical fiber 101. The middle area 103 and the surrounding area 104 are both periodic arrays of metallic micro-nano structures, and the periodic arrays of metallic micro-nano structures are periodic nanoslit arrays. The width of the nanoslits is 50 nm, and the depth of the nano slits is 55 nm. In an embodiment, the depth of the nanoslits is 55 nm (which is equal to the thickness of the metallic film, and the nanoslits penetrate through the metallic film). The periodic array of metallic micro-nano structures in the middle area 103 is a square array having an approximate size of 11×11 μm², a period of the periodic array of metallic micro-nano structure in the middle area 103 is 645 nm, which is approximately equal to the wavelength of surface plasmon resonance on the metallic film. The periodic arrays of metallic micro-nano structures in the surrounding area 104 surround the middle area 103, and forms a square array whose outer boundaries have an approximate size of 100×100 μm², a period of the periodic array of metallic micro-nano structures in the surrounding area 104 is 315 nm, which is approximately equal to half the wavelength of surface plasmon resonance on the metallic film. When a lightwave is incident upon the metallic micro-nano structures through the core layer of the optical fiber, the middle area 103 is coupled with the incident fiber-guided lightwaves so that surface plasmon polaritons (on the metallic film) are excited, and the surrounding area reflects the surface plasmon polaritons.

A specific implementation procedure is as follows: firstly, depositing a metallic film having a thickness of 55 nm on the piece of quartz substrate 106 by electron beam evaporation; then spin coating a poly (methyl methacrylate) (PMMA) film with a thickness of 50 to 200 nm on the metallic film; next, fabricating the patterns of a micro-nano structure resonance cavity on the PMMA film by electron beam lithography; then transferring the micro-nano patterns to the metallic film by argon ion beam milling to produce the metallic micro-nano structure resonance cavity 102; and finally, cleaning the sample by acetone to remove the PMMA film.

Figure 3:
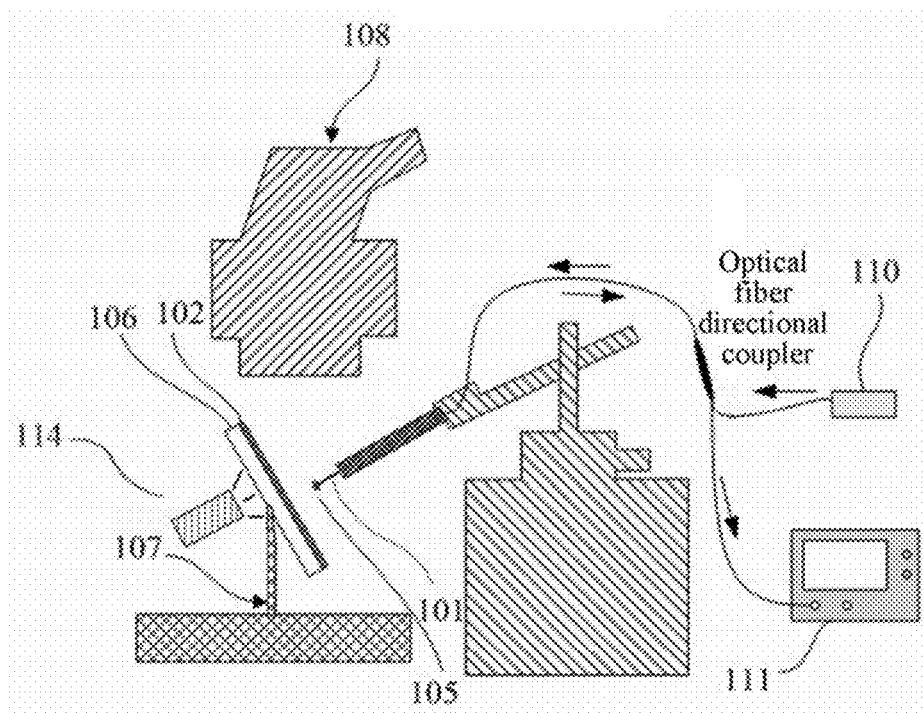
FIG. 3 shows a schematic diagram of fabricating a metallic micro/nano-structure resonance cavity on an end-facet of an optical fiber in an embodiment of a fabrication method of an optical fiber having a metallic micro/nano-structure on the end-facet according to the present invention.

In a specific embodiment of stripping the metallic micro/nano-structure resonance cavity 102 off the substrate 106, and transferring it to the end-facet of the optical fiber 101, as shown in FIG. 3, the substrate 106 on which the metallic micro/nano-structure resonance cavity 102 sits is fixed to the observation point under a stereomicroscope 108 at a certain angle to the horizontal plane using the mounting stage 107 (with the surface having the metallic micro/nano-structure resonance cavity 102 facing upwards). The angle adopted herein is 60°. A droplet of the adhesive 105 is applied on the end-facet of the optical fiber 101, and then the optical fiber 101 is fixed on a five-axis motion stage 109 comprising x, y, z, pitch rotating, and horizontal rotating axes. Observation is performed by using the stereomicroscope 108, and the five-axis motion stage 109 is adjusted to adjust the relative position of the optical fiber 101, so that the optical fiber 101 is perpendicular to the surface of the substrate 106, the end-facet of the optical fiber 101 is close to and is aligned with the metallic micro/nano-structure resonance cavity 102, and the adhesive 105 on the end-facet of the optical fiber 101 is in contact with the metallic micro/nano-structure resonance cavity 102. In an adjustment process of aligning the end-facet of the optical fiber 101 with the metallic micro/nano-structure resonance cavity 102, a wide-spectrum light from the wide-spectrum light source 110 is sent into the optical fiber 101. In a specific embodiment, the wide-spectrum light source 110 may be a bromine tungsten lamp. The wide-spectrum light propagates along the optical fiber 101, passes through an optical fiber directional coupler, and emits from the end-facet of the optical fiber. Next, the wide-spectrum light reflects off the metallic micro/nano-structure resonance cavity 102 and returns back into the optical fiber 101, and the reflected light passes through the optical fiber directional coupler and enters a spectrometer 111. The five-axis motion stage 109 is moved to adjust the relative position of the optical fiber 101 and the metallic micro/nano-structure resonance cavity 102, while the spectrum of the reflected light is being measured by using the spectrometer 111. By comparing the spectrum of the reflected light and the expected reflection spectrum that exists in a perfect alignment, the alignment between the end-facet of the optical fiber and the metallic micro/nano-structure may be determined and adjusted. In this embodiment, after the adhesive 105 on the end-facet of the optical fiber 101 is in contact with the metallic micro/nano-structure resonance cavity 102, the expected reflection spectrum for a perfect alignment has a low reflectivity dip at a wavelength of 930 nm. When the measured reflection spectrum has this dip and the depth of the dip is adjusted to its maximum, alignment between the end-facet of the optical fiber and the metallic micro/nano-structure is completed, that is, the position of the middle area 103 is aligned with the core layer of the optical fiber 101.

Figure 5:
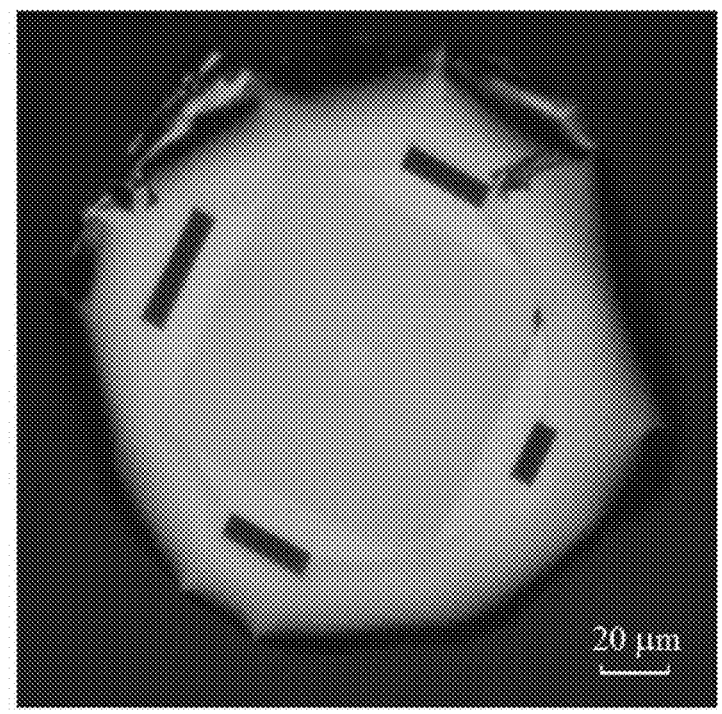
FIG. 5 shows a picture of an end-facet of an optical fiber having a metallic micro/nano-structure on the end-facet and a metallic micro/nano-structure resonance cavity on the end-facet under an optical microscope according to the present invention.
Figure 6:
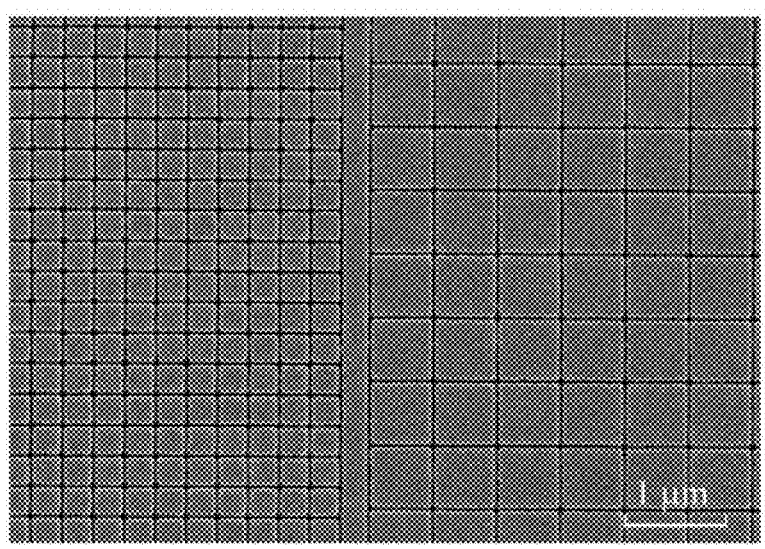
FIG. 6 shows a picture of a metallic micro/nano-structure resonance cavity on an end-facet of an optical fiber having a metallic micro/nano-structure on the end-facet under a scanning electron microscope according to the present invention, wherein a boundary of a middle area and a surrounding area thereof is shown.

Finally, the adhesive 105 is exposed under an adhesive curing light, from the side of the back surface of the quartz piece substrate 106, where the curing light penetrates through the substrate and the metallic micro/nano-structure before it reaches the adhesive, so that the adhesive 105 is cured. The adhesive 105 is irradiated from the side of the back surface of the quartz piece substrate 106 by using the light source 114 of the adhesive curing light, to prevent the optical fiber from affecting the curing so as to improve the curing effect. In this embodiment, the light source 114 of the adhesive curing light is an ultraviolet light source with a center wavelength of 320 nm, the curing light intensity is 100 J/cm², and the curing time is 300 s. Finally, the optical fiber 101 is quickly removed in a direction perpendicular to the surface of the substrate 106, to strip the end-facet of the optical fiber and the metallic micro/nano-structure resonance cavity 102 off the surface of the substrate 106, and complete transferring of the metallic micro/nano-structure resonance cavity 102 to the end-facet of the optical fiber 101, thereby completing fabrication. A picture of the finished device is shown in FIG. 5 and FIG. 6. The rectangular black areas in FIG. 5 are alignment marks, the circular rim is the periphery of the cladding layer of the optical fiber, the irregular rim is the periphery of the metallic film, the square shaded area is the surrounding area of the metallic micro-nano structure, and the square brighter area in the center of the shaded area is the middle area of the metallic micro-nano structure. FIG. 6 shows a boundary between the middle area 103 and the surrounding area 104.

Figure 4:
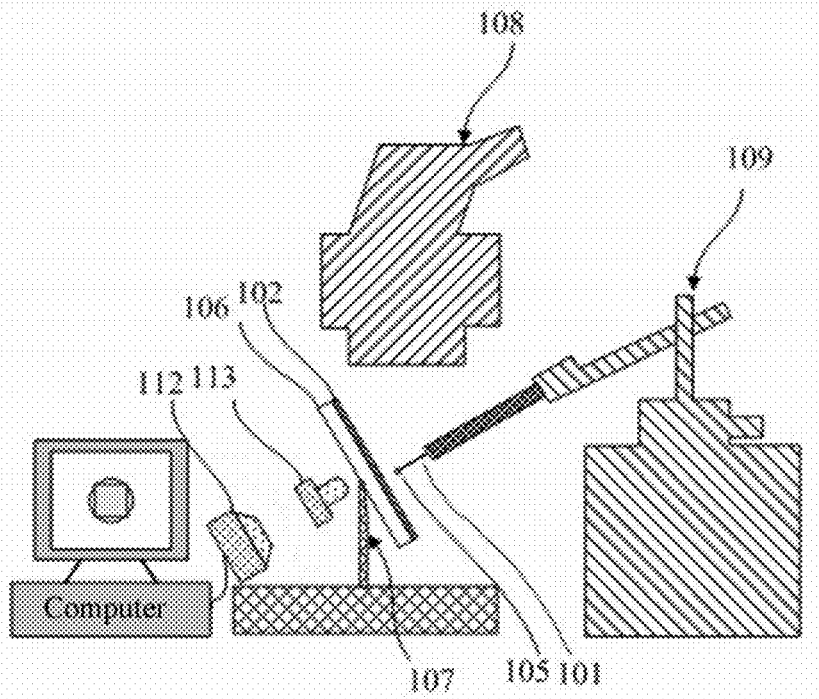
FIG. 4 shows a schematic diagram of fabricating a metallic micro/nano-structure resonance cavity on an end-facet of an optical fiber in another embodiment of a fabrication method of an optical fiber having a metallic micro/nano-structure on the end-facet according to the present invention.

In another specific embodiment, as shown in FIG. 4, when the substrate 106 is a transparent substrate (such as glass, quartz, or mica), the following implementation may alternatively be used to align the end-facet of the optical fiber 101 with the position of the metallic micro/nano-structure resonance cavity 102:

The optical fiber 101 and the metallic micro/nano-structure resonance cavity 102 are mounted in position in the same manner as that in the previous embodiment. A lens 113 (20× microscope objective) and an imaging device 112 are combined to form a microscopy system on the side of the back surface of the substrate 106, which is used for performing microscopy observation. The imaging device 112 may be a camera. Enlarged pictures of the end-facet of the optical fiber 101 and the metallic micro/nano-structure resonance cavity 102 are displayed on a computer display connected to the imaging device. The end-facet of the optical fiber 101 and the position of the metallic micro/nano-structure resonance cavity 102 are observed and aligned by using the pictures on the display and adjusting the five-axis motion stage 109. After the alignment between the end-facet of the optical fiber 101 and the position of the metallic micro/nano-structure resonance cavity 102 is completed, subsequent steps that are the same as those in the previous embodiment are performed, including: exposing the adhesive 105 under an ultraviolet light, to cure the adhesive 105. The light source 114 of the adhesive curing light is not shown in FIG. 4. In this embodiment, the method for aligning the end-facet of the optical fiber 101 with the position of the metallic micro/nano-structure does not depend on the metallic micro/nano-structure resonance cavity, and therefore the method is also applicable to the alignment of a metallic micro/nano-structure which does not form a resonance cavity.

The present invention further provides an application method of using an optical fiber 101 having a metallic micro/nano-structure on the end-facet as a sensor, wherein the end-facet is an optical fiber end-facet which is approximately perpendicular to the optical fiber, the metallic micro/nano-structure is a metallic micro/nano-structure resonance cavity 102, the metallic micro/nano-structure resonance cavity 102 is formed by the micro-nano patterns on the metallic film, and the metallic micro/nano-structure resonance cavity makes the surface plasmon polaritons on the metallic film resonate, and the method comprises the following steps:

(1) let the end-facet of the optical fiber 101 that comprises the metallic micro/nano-structure resonance cavity 102 be in contact with or approaching a medium, wherein the medium may be an external substance, such as molecules that adsorb or bind on to the end-facet of the optical fiber and/or the metallic surface, and ambient liquids and gases, or the medium may be a substance inside the optical fiber sensing device, such as the adhesive or another substance between the metallic micro/nano-structure and the end-facet of the optical fiber, or a substance which is additionally deposited on the metallic surface and/or the end-facet of the optical fiber;

(2) collecting the reflected light that has propagated along the optical fiber 101, reached the end-facet of the optical fiber 101 and been emitted, and then been reflected back into the optical fiber 101 after experiencing surface plasmon resonance at the metallic micro/nano-structure resonance cavity 102; and (3) analyzing a spectrum and/or an intensity of this reflected light, and obtaining information about the refractive index of the medium according to the change of wavelength and/or reflectivity of surface plasmon resonance with the change of the ambient refractive index.

In a specific embodiment, the optical fiber is a single-mode optical fiber (Nufern 780-HP) with wavelength above 780 nm, and the leading end of the optical fiber is a bare optical fiber. The metal is gold. The metallic micro/nano-structure resonance cavity 102 comprises a middle area 103 and a surrounding area 104. The position of the middle area 103 is aligned with a core layer of the optical fiber 101. The middle area 103 and the surrounding area 104 are both periodic arrays of metallic micro-nano structures, and the periodic array of metallic micro-nano structures are periodic nanoslit arrays. The width of the nanoslits is 50 nm, and the depth of the nanoslit is 55 nm (which is equal to the thickness of the metallic film, and the nanoslit penetrates through the metallic film). The periodic array of metallic micro-nano structures in the middle area 103 is a square array having an approximate size of 11×11 μm², a period of the periodic array of metallic micro-nano structures in the middle area 103 is 645 nm, which is approximately equal to the wavelength of surface plasmon resonance on the metallic film. The periodic arrays of metallic micro-nano structures in the surrounding area 104 surround the middle area 103, and form a square array whose outer boundaries have an approximate size of 100×100 μm², a period of the periodic arrays of metallic micro-nano structures in the surrounding area 104 is 315 nm, which is approximately equal to half the wavelength of surface plasmon resonance on the metallic film. When a lightwave is incident upon the metallic micro-nano structures through the core layer of the optical fiber, the middle area 103 is coupled with the incident fiber-guided lightwaves so that surface plasmon polaritons (on the metallic film) are excited, and the surrounding area reflects the surface plasmons polaritions.

Figure 7:
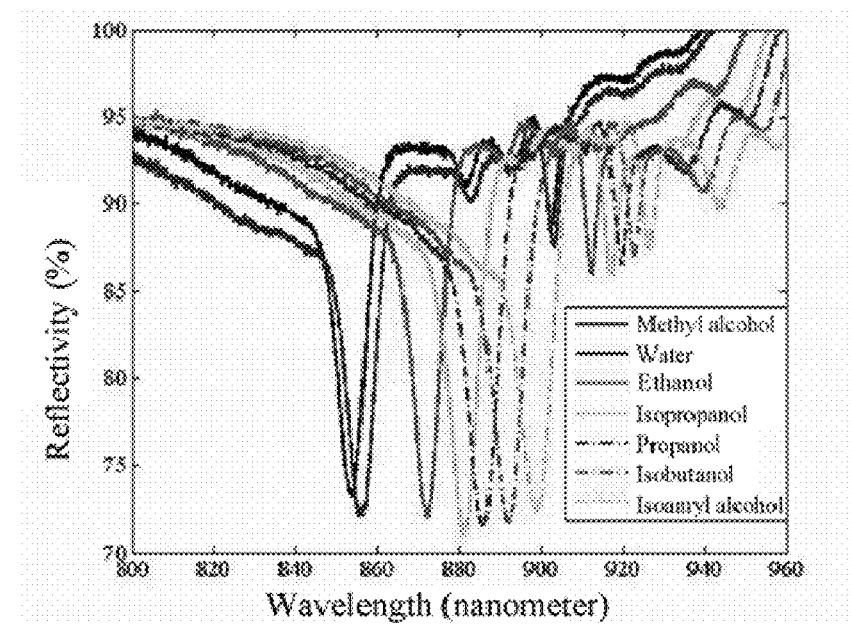
FIG. 7 shows the reflection spectra when an end-facet of an optical fiber having a metallic micro/nano-structure on the end-facet is inserted into seven different solutions according to the present invention.

In a specific embodiment, the end-facet of the optical fiber 101 having the metallic micro/nano-structure resonance cavity 102 on the end-facet is inserted into seven different solutions: methanol with a concentration of 99.7%, water, ethanol with a concentration of 99.7%, isopropanol with a concentration of 99.7%, propanol with a concentration of 99.7%, isobutanol with a concentration of 99.7%, and isoamyl with a concentration of 99.7%. A wide-spectrum light is sent into the optical fiber 101 by using a wide-spectrum light source, and the wide-spectrum light source used herein is a super-luminescent diode with a wavelength range from 790 nm to 970 nm. The wide-spectrum light propagates along the optical fiber 101, passes through an optical fiber directional coupler, and then is emitted out of the end-facet of the optical fiber. The optical fiber directional coupler used herein is a 2×2 and 50%:50% directional coupler with a center working wavelength of 850 nm. Next, the wide-spectrum light is reflected by the metallic micro/nano-structure resonance cavity 102 on the end-facet of the optical fiber to return back into the optical fiber 101, and the reflected light passes through the optical fiber directional coupler and enters a spectrometer (the spectrometer uses a CCD photon detector, and uses a grating to disperse different wavelengths). FIG. 7 shows the normalized reflection spectra obtained when the end-facet of the optical fiber 101 having the metallic micro/nano-structure resonance cavity on the end-facet is inserted into the seven different solutions. The shortest wavelength reflection dip in each spectrum corresponds to surface plasmon resonance on the interface of the metallic micro/nano-structure resonance cavity and the solution. The refractive index sensitivity thereof is 572 nm/RIU, the full-width at half-maximum of the resonance dips is 8-9 nm, the figure of merit (FOM) which is the former divided by the latter is 68. This FOM value is over 20 times higher than previously reported values for surface plasmon resonance at the end-facets of single-mode optical fibers.

Figure 8:
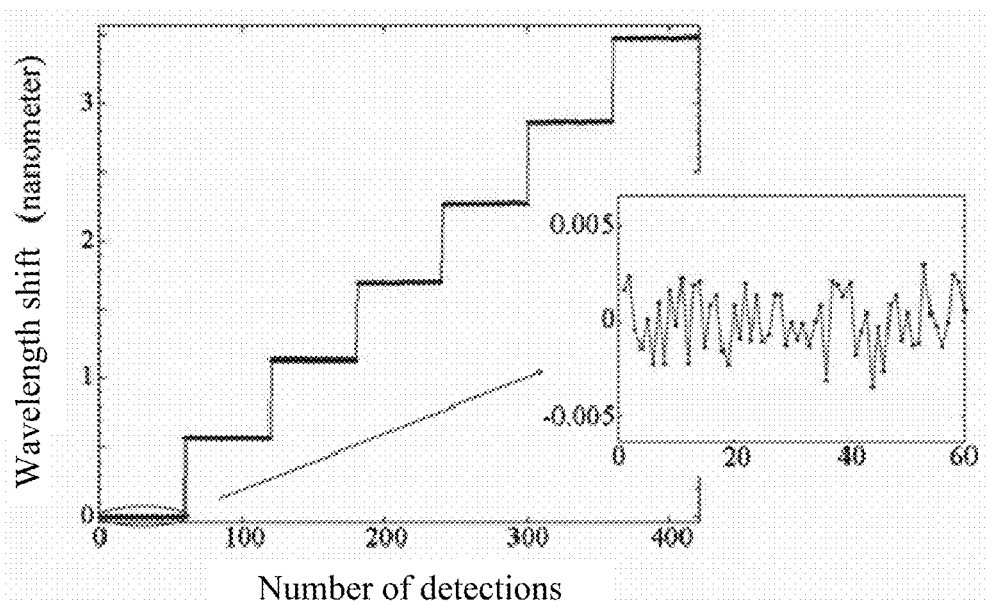
FIG. 8 shows a measurement result that a wavelength of surface plasmon resonance changes with the concentration of solution when an end-facet of an optical fiber having a metallic micro/nano-structure on the end-facet is inserted into an ethanol solution whose concentration changes by small steps according to the present invention.

In another embodiment, the end-facet of the optical fiber 101 having the metallic micro/nano-structure resonance cavity 102 on the end-facet is inserted into an ethanol solution whose concentration changes by small steps. The change of surface plasmon resonance wavelength corresponding to the change in concentration is measured by using the same method as described in the foregoing, with an integration time for each measurement data point of 1 second, as shown in FIG. 8. FIG. 8 shows a 3× root-mean-square (RMS) error of the surface plasmon resonance wavelength measurement results of approximately 0.005 nm, which corresponds to a limit of detection for refractive index change of $8 \times 10^{-6}$ RIU, being more than one order of magnitude lower than the results in the prior art.

Moreover, the ambient pressure of the end-facet of the optical fiber may alternatively be measured by attaching to the end-facet of the optical fiber a substance whose refractive index changes with the pressure. For example, the pressure may come from a sound wave, an ultrasonic wave, or an infrasonic wave in a liquid, and the substance may be the adhesive or another substance between the metallic micro/nano-structure and the end-facet of the optical fiber, or a substance which is additionally deposited on the metallic surface and/or the end-facet of the optical fiber.

In conclusion, in the optical fiber having a metallic micro/nano-structure on the end-facet in the present invention, when the fiber-optic guided lightwaves are incident upon the micro/nano-structure, the resonance of surface plasmon polaritons on the metallic film on the end-facet of the optical fiber is induced at the resonance cavity, therefore, the present invention allows high-performance surface plasmon resonance to be excited and probed by using fiber-optic guided-wave technologies. Moreover, the fabrication method according to the present invention avoids complicated processing procedures and high costs caused by performing micro-nano processing directly upon the end-facet of the optical fiber, and it enables simple and fast alignment, gluing, stripping and transfer of the metallic micro/nano-structure onto the end-facet of the optical fiber with high quality. By irradiating the adhesive at the end-facet of the optical fiber with ultraviolet exposure through the substrate, the adhesive can be well cured. The application method according to the present invention provides a novel refractive index sensing device. In the embodiments of the present invention, the high-performance fiber-integrated surface plasmon resonance not only provides a simple and convenient way for refractive index measurement, but also achieves a limit of detection as low as on the order of magnitude of $10^{-6}$ RIU, which is far more precise than in the prior art. In brief, the optical fiber having a metallic micro/nano-structure on the end-facet, and the fabrication method and the application method thereof according to the present invention provide high-performance surface plasmon resonance sensing capabilities, efficient and simple fabrication methods, and a broad range of prospective applications.

Therefore, the present invention has effectively resolved the disadvantages in the prior art and have high industry values.

The foregoing embodiments are only intended to exemplarily illustrate the principle and effect of the present invention, and are not to limit the present invention. Accordingly, any person skilled in the art may make modifications or variations to the foregoing embodiments without departing from the spirit and category of the present invention. Therefore, all equivalent modifications or variations made by a person with ordinary skill in the art without departing from the spirit and technical idea of the present invention should be covered by the claims of the present invention.

What is claimed is:

1. A single-mode optical fiber with a metallic nano-structure resonance cavity for producing a resonance of surface plasmon polaritons (SPP), comprising:
    the metallic nano-structure resonance cavity located on an end-facet of the optical fiber and formed by nano patterns in a metallic film;
    wherein
    the metallic nano-structure resonance cavity comprises a middle area and is constrained by a surrounding area;
    the middle area is aligned with a core layer of the optical fiber and is used to couple the fiber-guided lightwaves into SPPs on an outer surface of the metallic film, and
    a period of the metallic nano structures in the middle area is different from a period of the metallic micro-nano structures in the surrounding area so that the SPPs resonate by propagating back and forth across the middle area within the metallic nano-structure resonance cavity.

2. The optical fiber according to claim 1, wherein the end-facet of the optical fiber is approximately perpendicular to a longitudinal axis of the optical fiber.

3. The optical fiber according to claim 1, wherein the nano patterns are periodic arrays of nanoslits, with the period in the middle area being approximately equal to a wavelength of the coupled SPPs, and the period in the surrounding area being approximately equal to half the wavelength of the coupled SPPs.

4. The optical fiber according to claim 3, wherein a width of the nanoslits is 5 to 200 nm and a depth of the nanoslits is 5 to 200 nm.

5. A fabrication method of the optical fiber of claim 1, comprising at least the following steps of:
    1) providing a substrate and an optical fiber;
    2) fabricating, on a surface of the substrate, a metallic nano-structure having a property of being weakly adherent to the substrate;
    3) applying an adhesive on an end-facet of the optical fiber or the surface of the metallic nano-structure;
    4) adjusting a relative position of the optical fiber so that the end-facet of the optical fiber is aligned with a position of the metallic nano-structure; and
    5) exposing the adhesive under adhesive curing light where the curing light penetrates through the substrate and the metallic nano-structure before it reaches the adhesive, so that the adhesive is cured and the cured adhesive binds the metallic nano-structure to the end-facet of the optical fiber; and
    6) removing the end-facet of the optical fiber and the metallic nano-structure from the surface of the substrate to complete the fabrication.

6. The fabrication method according to claim 5, wherein the substrate is a substrate transparent to ultraviolet light, the adhesive curing light is ultraviolet light, and the adhesive is cured when being irradiated by the ultraviolet light.

7. The fabrication method according to claim 5, wherein the step for aligning the end-facet of the optical fiber with the position of the metallic nano-structure comprises:
- sending wide-spectrum light into the optical fiber, wherein the wide-spectrum light propagates along the optical fiber, is emitted from the end-facet of the optical fiber, and is reflected off the metallic nano-structure to return back into the optical fiber,
- moving relative positions of the optical fiber and the metallic nano-structure,
- measuring a spectrum of the reflected light during the movement step, and
- determining whether the end-facet of the optical fiber is aligned with the metallic nano-structure by comparing the spectrum of the reflected light with an expected reflection spectrum corresponding to a perfect alignment.

8. The fabrication method according to claim 5, wherein when the substrate is a transparent substrate, the step for aligning the end-facet of the optical fiber with the position of the metallic nano-structure comprises:
- performing microscopy observation from the direction of the surface of the substrate which does not have the metallic nano-structure, and
- observing and aligning the end-facet of the optical fiber with the position of the metallic nano-structure.

9. An application method of using the optical fiber of claim 1 as a sensor, comprising the steps of:
(1) moving the end-facet of the optical fiber that comprises the metallic nano-structure resonance cavity towards a medium and contacting it;
(2) collecting reflected light, wherein the reflected light is transmitted along the optical fiber to reach the end-facet of the optical fiber, be coupled into SPPs in the metallic nano-structure resonance cavity, be reflected back to the same optical fiber, and subsequently be collected; and
(3) analyzing a spectrum and/or intensity of the reflected light to obtain information about a refractive index of the medium.

* * * * *